US012784559B2

(12) United States Patent
Pijlman et al.

(10) Patent No.: US 12,784,559 B2
(45) Date of Patent: Nov. 3, 2026

(54) SECURITY SYSTEM AND METHOD FOR ESTIMATION OF INTRUSION BY AN OBJECT IN A SPACE

(71) Applicant: SIGNIFY HOLDING B.V., Eindhoven (NL)

(72) Inventors: Fetze Pijlman, Eindhoven (NL); Harry Broers, 'S-Hertogenbosch (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 14 days.

(21) Appl. No.: 18/849,081

(22) PCT Filed: Mar. 21, 2023

(86) PCT No.: PCT/EP2023/057129

§ 371 (c)(1),
(2) Date: Sep. 20, 2024

(87) PCT Pub. No.: WO2023/180275

PCT Pub. Date: Sep. 28, 2023

(65) Prior Publication Data

US 2025/0232652 A1 Jul. 17, 2025

(30) Foreign Application Priority Data

Mar. 22, 2022 (EP) .................................... 22163433

(51) Int. Cl.
*G08B 13/189* (2006.01)

(52) U.S. Cl.
CPC .................................. *G08B 13/189* (2013.01)

(58) Field of Classification Search
CPC ................ G08B 13/189; G08B 13/196; G08B 13/2491; G08B 19/00; G01S 17/04; Y02B 20/40
See application file for complete search history.

(56) References Cited

U.S. PATENT DOCUMENTS 7,378,942 B2 * 5/2008 Seeley .................... G06F 30/13
340/8.1
8,872,964 B2 10/2014 Reed et al.
(Continued)

FOREIGN PATENT DOCUMENTS

KR 20130087290 A 8/2013

*Primary Examiner* — Mirza F Alam

(57) ABSTRACT

A security system (100) and method (500) for estimation of intrusion by an object (110) in a space (120) are provided. The security system comprises a processor (130), configured to obtain information of the illumination of a first subspace (140) of the space having a first level of illumination, $I_1$, within a first light intensity interval, $R_1$, and to obtain information of the illumination of a second subspace (200) of the space, being spatially separated from the first subspace and having a second level of illumination, $I_2$, within a second light intensity interval, $R_2$, wherein $\max(R_1)<\min(R_2)$, a sensor (160) communicatively coupled to the processor, wherein the sensor is configured to detect motion of the object, wherein the processor is configured to estimate a first level of probability, $LP_1$, of intrusion by the object in the space based on a detected motion of the object, by the sensor, in the first subspace; estimate a second level of probability, $LP_2$, of intrusion by the at least one object in the space based on a detected motion of the at least one object, by the at least one sensor, in at least one of the at least one second subspace, wherein $LP_1>LP_2$.

15 Claims, 3 Drawing Sheets

(56) References Cited

U.S. PATENT DOCUMENTS

| | | | | |
|---|---|---|---|---|
| 8,970,374 | B2 | 3/2015 | Guetta et al. | |
| 9,224,060 | B1 * | 12/2015 | Ramaswamy | G06V 40/67 |
| 10,516,292 | B2 | 12/2019 | Chen | |
| 2005/0286764 | A1 * | 12/2005 | Mittal | G06T 7/269<br>382/181 |
| 2015/0055821 | A1 * | 2/2015 | Fotland | G06V 10/255<br>382/103 |
| 2016/0119558 | A1 * | 4/2016 | Kaneko | G01N 21/27<br>348/164 |
| 2018/0176512 | A1 | 6/2018 | Siminoff | |

* cited by examiner

SECURITY SYSTEM AND METHOD FOR ESTIMATION OF INTRUSION BY AN OBJECT IN A SPACE

CROSS-REFERENCE TO PRIOR APPLICATIONS

This application is the U.S. National Phase application under 35 U.S.C. § 371 of International Application No. PCT/EP2023/057129, filed on Mar. 21, 2023, which claims the benefit of European Patent Application No. 22163433.0, filed on Mar. 22, 2022. These applications are hereby incorporated by reference herein.

FIELD OF THE INVENTION

The present invention generally relates to security systems and methods for monitoring spaces. More specifically, the present invention relates to a security system and a method for estimation of intrusion by an object in a space.

BACKGROUND OF THE INVENTION

There is an increased demand for security systems for homes, offices, factories, shops, etc., wherein these systems are able to provide monitoring, surveillance and/or detection in a vicinity of the places or buildings as exemplified. There is a particular interest in systems which may provide an increased security for homes in order to impede burglary and theft.

In the prior art, there are numerous systems which comprise one or more of sensors that can detect the presence and/or motions of persons. For example, systems of this kind may comprise sensors which are able to provide monitoring and/or surveillance in the vicinity of a house, such as in the garden of the house, the parking space, etc. U.S. Pat. No. 8,970,374B2 discloses for example a system for detecting intrusion across a surface by evaluating reflected illumination.

A challenge with these systems is the prevention, or at least impediment, of "false positives", i.e. that the sensor(s) detect presence and/or motions of one or more objects, but that the object(s) is (are) not likely to have malicious intent. In other words, many prior art systems may be able to detect object(s), and in some cases even set of alarm(s), albeit the probability that the object(s) detected has (have) the intention of a malicious action (such as a burglary, espionage, trespassing, etc.) may be low. Analogously, another challenge with prior art systems is a too low level of "true positives", i.e. that the systems may not detect and/or not set off any alarm albeit it may be likely that the object(s) detected has (have) the intention of a malicious action.

Hence, it is desired to provide a system which may monitor and detect object(s), e.g. in a vicinity of a building such as a home, wherein such a system is able to reduce "false positives" and to increase "true positives" for intruder detection.

SUMMARY OF THE INVENTION

It is an object of the present invention to provide a system which may monitor and detect object(s), e.g. in a vicinity of a building such as a home, wherein the system is able to reduce "false alarms" of object(s) which likely do not have malicious intent (such as e.g. burglary, espionage and/or trespassing), and at the same time provide and increased surveillance and/or alarm for "true positives" for intruder detection.

This and other objects are achieved by providing a security system and a method having the features in the independent claims. Preferred embodiments are defined in the dependent claims.

Hence, according to a first aspect of the present invention, there is provided a security system for estimation of intrusion by at least one object in a space. The security system comprises a processor, configured to obtain information of an illumination of at least one first subspace of the space, wherein each of the at least one first subspace has a respective first level of illumination, $I_1$, within a first light intensity interval, $R_1$. The processor is further configured to obtain information of an illumination at least one second subspace of the space, the at least one second subspace being spatially separated from the at least one first subspace, and wherein each of the at least one second subspace has a respective second level of illumination, $I_2$, within a second light intensity interval, $R_2$, wherein $\max(R_1)<\min(R_2)$. The security system further comprises at least one sensor communicatively coupled to the processor, wherein the at least one sensor is configured to detect motion of the at least one object in the space, wherein the processor, based on the obtained information of the illumination of the at least one first subspace and the obtained information of the at least one second subspace, is configured to: estimate a first level of probability, $L_{P1}$, of intrusion by the at least one object in the space based on a detected motion of the at least one object, by the at least one sensor, in at least one of the at least one first subspace; estimate a second level of probability, $L_{P2}$, of intrusion by the at least one object in the space based on a detected motion of the at least one object, by the at least one sensor, in at least one of the at least one second subspace; wherein $L_{P1}>L_{P2}$.

Said information of the illumination may alternatively be phrased as illumination information, or information indicative of the illumination. Said information may for example comprise (or be) the level of illumination of the respective at least one subspace.

According to a second aspect of the present invention, there is provided a method for estimation of intrusion by at least one object in a space. The method comprises obtaining information of an illumination of at least one first subspace of the space, wherein the at least one first subspace has a first level of illumination, $I_1$, within a first light intensity interval, $R_1$. The method further comprises obtaining information of an illumination of at least one second subspace of the space, the at least one second subspace being spatially separated from the at least one first subspace and having a second level of illumination, $I_2$, within a second light intensity interval, $R_2$, wherein $\max(R_1)<\min(R_2)$. The method further comprises detecting motion of the at least one object, and estimating, based on the obtained information of the illumination of the at least one first subspace and the obtained information of the illumination of the at least one second subspace, a first level of probability, $L_{P1}$, of intrusion by the at least one object in the space based on a detected motion of the at least one object in at least one of the at least one first subspace; estimating a second level of probability, $L_{P2}$, of intrusion by the at least one object in the space based on a detected motion of the at least one object, by the at least one sensor, in at least one of the at least one second subspace; wherein $L_{P1}>L_{P2}$ Thus, the present invention is based on the idea of obtaining information of first and second subspaces of a space for intrusion estimation, wherein the first subspace(s) has (have) a lower level of illumination than the second subspace(s). Based on the obtained information (of the illumination) of the at least one first and second subspaces, the system is configured to estimate a (first) level of probability, $L_{P1}$, of intrusion by object(s) in the space is based on a detected motion of object(s) in the first subspace(s).

The present invention is advantageous based on the observation that an object (person) with malicious intent attempting to intrude into the space may be more inclined to avoid areas or spaces which are (relatively) illuminated, i.e. (the second) subspaces of the space with a relatively high level of illumination, and instead move in areas or spaces which have a lower illumination, i.e. (the first) subspaces of the space with a relatively low level of illumination.

The present invention is further advantageous in that it efficiently prevents, or at least impedes, "false positives". In other words, the security system may detect presence and/or motions, via the sensor(s), of one or more objects, and the security system may dependently estimate that the probability of intrusion is (relatively) low, i.e. that the object(s) (are) not likely to have malicious intent. Analogously, the present invention is further advantageous in that it efficiently increases the detection or estimation of "true positives", i.e. that the security system may dependently estimate that the probability of intrusion is (relatively) high, e.g. in case of a malicious action (such as a burglary, trespassing, espionage, etc.) of the detected object(s).

The present invention is further advantageous that the security system is able to conveniently classify the object(s) in the space based on the estimated level of probability, $L_P$, of intrusion by the object(s). For example, the security system may be able to provide a classification of one or more approaching persons.

There is provided a security system for estimation of intrusion by at least one object in a space. By the term "object", it is here meant e.g. person(s), animal(s), device(s) (e.g. drone(s)), etc. By the term "estimation of intrusion", it is here meant an estimation and/or prediction of intrusion, espionage, trespassing, or the like, by malicious intent by the object(s) in the space. The security system comprises a processor, configured to obtain information of at least one first subspace of the space, wherein each of the at least one first subspace has a respective first level of illumination, $I_1$, within a first light intensity interval, $R_1$. Hence, the first subspace(s) is (are) part(s) of the space, having a first level of illumination, $I_1$, within a first light intensity interval (range), $R_1$. It should be noted that the first subspaces may have the same, or different, level(s) of illumination, $I_1$. It will be appreciated that the first subspace(s) may be illuminated arbitrarily, i.e. by (day)light, artificial light, etc. The processor is further configured to obtain information of at least one second subspace of the space, the at least one second subspace being spatially separated from the at least one first subspace, wherein each of the at least one second subspace has a respective second level of illumination, $I_2$, within a second light intensity interval, $R_2$, wherein max $(R_1)<$min $(R_2)$. Hence, the second subspace(s) is (are) part(s) of the space, each having a respective second level of illumination, $I_2$, within a second light intensity interval, $R_2$, wherein the second level(s) of illumination, $I_2$, is higher than the first level(s) of illumination, $I_1$. In the following, the first (second) light intensity interval may be denoted first (second) interval for simplicity. It should be noted that the second subspaces may have the same, or different, level(s) of illumination, $I_2$. It will be appreciated that the second subspace(s) may be illuminated arbitrarily, i.e. by (day)light, artificial light, etc. The security system further comprises at least one sensor communicatively coupled to the processor, wherein the at least one sensor is configured to detect motion of the at least one object in the space. By the term "sensor", it is here meant substantially any kind of sensor which is configured for object monitoring, surveillance and/or detection. The processor is configured to estimate, based on the obtained information of the at least one first subspace and the obtained information of the at least one second subspace, a level of probability, $L_P$, of intrusion by the at least one object in the space based on a detected motion of the at least one object, by the at least one sensor, in at least one of the at least one first subspace. By the term "intrusion", it is here meant intrusion, trespassing, espionage, or the like, by the object(s). Hence, via the sensor(s), the processor is configured to estimate, predict and/or determine a level of probability, $L_P$, of intrusion by the object(s) in the space based on a detected motion of the object(s) in one or more of the first subspace(s).

As mentioned, the processor may be further configured to estimate the second level of probability, $L_{P2}$, of intrusion by the at least one object in the space based on a detected motion of the at least one object, by the at least one sensor, in at least one of the at least one second subspace. The present embodiment is advantageous in that the ability of the security system to estimate of the level of probability, $L_P$, of intrusion by the at least one object in the space may be even more accurate by estimating the level of probability, $L_P$, of intrusion by the object(s) in the space based on a detected motion of the object(s) in the first subspace(s) as well as in the second subspace(s). For example, the security system may detect (a) motion(s) of object(s) moving in and/or from the first subspace(s) to the second subspace(s), and thereby estimate that the second level of probability, $L_{P2}$, of intrusion by the object(s) may be lower compared to motion of object(s) which (only) take place in the first subspace(s). Hence, the security system may efficiently estimate the level of probability, $L_P$, of intrusion by the object(s) in the space based on object motion(s) in the first and second subspaces having different levels of illumination.

According to an embodiment of the present invention, the security system may further comprise at least one light source arranged to illuminate the at least one first subspace of the space by the respective first level of illumination, $I_1$, within the first interval, $R_1$. The present embodiment is advantageous in that the security system may more conveniently maintain and/or control the illumination of the first subspace(s) via its light source(s).

According to an embodiment of the present invention, the at least one light source may be arranged to illuminate the at least one second subspace of the space by the respective second level of illumination, $I_2$, within the second interval, $R_2$. The present embodiment is advantageous in that the security system, via its light source(s), may more conveniently maintain and/or control the illumination of the second subspace(s).

According to an embodiment of the present invention, the security system may further comprise a control unit coupled to the at least one light source, wherein the control unit is configured to control the at least one light source to illuminate the at least one first subspace of the space. The present embodiment is advantageous in that the control unit provides a higher degree of versatility regarding the illumination of the first subspace(s), which in turn may lead to an even higher accuracy of the estimated level of probability, $L_P$, of intrusion by the object(s). For example, and according to an embodiment of the present invention, the control unit may be further configured to control the at least one light source to illuminate the at least one first subspace of the space by the first level of illumination, $I_1$, within the first interval, $R_1$.

According to an embodiment of the present invention, the control unit may be further configured to control the at least one light source to illuminate the at least one second subspace of the space by the second level of illumination, $I_2$, within the second interval, $R_2$.

According to an embodiment of the present invention, the control unit may be further configured to control the at least one light source to illuminate the at least one first subspace of the space by a first color, $C_1$, and the at least one second subspace of the space by a second color, $C_2$, wherein the first color, $C_1$, is different from the second color, $C_2$. Hence, the control unit may be configured to control the light source(s) of the security system such that the first subspace(s) and the second subspace(s) are illuminated by first and second colors, $C_1$, $C_2$, respectively. The present embodiment is advantageous in that the security system may to an even higher extent classify the detected object(s), and thereby improve the accuracy of the estimated level of probability, $L_P$, of intrusion by the object(s) in the space. For example, it will be appreciated that some animals (e.g. cats) cannot see red color, which enables the differentiation by the security system between motion(s) of cat(s) and person(s).

According to an embodiment of the present invention, wherein in case the estimated first level of probability, $L_{P1}$, of intrusion by the at least one object in the space is above a predetermined threshold, $T_P$, the control unit may be further configured to control the at least one light source to illuminate the at least one first subspace of the space by a respective third level of illumination, $I_3$, within a third interval, $R_3$, wherein max $(R_1)<$min $(R_3)$, and illuminate at least one third subspace (400) of the space, wherein the at least one third subspace is adjacent to the at least first subspace, by a respective fourth level of illumination, $I_4$, within a fourth interval, $R_4$, wherein max $(R_4)<$min $(R_3)$, wherein the processor is configured to estimate the level of probability, $L_P$, of intrusion by the at least one object in the space based on a detected motion of the at least one object, by the at least one sensor, in at least one of the at least one third subspace. Hence, in case the security system estimates that the level of probability, $L_P$, of intrusion by the object(s) in the space is relatively high (i.e. being above the predetermined threshold, $T_P$), the control unit is configured to light up the first subspace(s) to the third level of illumination, $I_3$, and further illuminate adjacently arranged (third) subspaces to a fourth level of illumination, $I_4$, being lower than the third level of illumination, $I_3$. It will be appreciated that in case one or more objects (persons) move from the first and/or second subspace(s) into the third subspace(s), this may indicate a malicious intent of the object(s)/person(s) and thereby increase the level of probability, $L_P$, of intrusion as estimated by the security system. In contrast, in case the object(s)/person(s) remain in the first and/or second subspace(s), this may contradict or impugn a malicious intent of the object(s)/person(s) and thereby decrease the level of probability, $L_P$, of intrusion as estimated by the security system. The present embodiment is hereby advantageous in that the security system may even further improve its accuracy regarding the estimation of the level of probability, $L_P$, of intrusion in the space.

According to an embodiment of the present invention, wherein in case the estimated first level of probability, $L_{P1}$, of intrusion by the at least one object in the space is above a predetermined threshold, $T_P$, the control unit may be further configured to control the at least one light source to illuminate the at least one first subspace of the space and the at least one second subspace of the space by the respective second level of illumination, $I_2$, within the second interval, $R_2$. Hence, in case the security system estimates that the level of probability, $L_P$, of intrusion by the object(s) in the space is relatively high (i.e. being above the predetermined threshold, $T_P$), the control unit may be configured to light up the first and second subspaces to the second (i.e. relatively high) level of illumination, $I_2$. The present embodiment is advantageous in that a plausible intruder may be intimidated by the higher illumination setting by the security system, and, possibly, interrupt a malicious action such as a burglary and/or that the plausible intruder escapes from the space.

According to an embodiment of the present invention, the processor may be configured to determine if the at least one object is a person. The present embodiment is advantageous in that the estimated level of probability, $L_P$, of intrusion by the person(s) in the space based on a detected motion of the person(s), by the at least one sensor may be even more accurate. For example, the estimated level of probability, $L_P$, of intrusion may be changed based if the processor determines that the object(s) is a person instead of a unit such as a drone.

According to an embodiment of the present invention, the at least one sensor may comprise at least one of an image-capturing device, a camera, a radar, a passive infrared, PIR, sensor, a microphone, a pressure sensor, a thermopile sensor, a time-of-flight proximity sensor, and a radio frequency, RF, sensor. Hence, the security system may comprise any combination of the sensor(s) exemplified. The present embodiment is advantageous in that the security system may comprise the (type of) sensor(s) which is (are) most suitable for the space where object intrusion is to be estimated.

According to an embodiment of the present invention, at least one of the at least one sensor may be arranged in at least one of the at least one light source. The present embodiment is advantageous in that the sensor(s) may be conveniently arranged in the light source(s) arranged to illuminate the first and/or second subspaces.

According to an example of the present invention, at least one of the at least one sensor may be rotatable. The present example is advantageous in that the rotatable sensor(s) may provide an improved detection of object(s), which in turn may lead to an even more accurately estimated level of probability, $L_P$, of intrusion by the person(s) in the space.

According to an embodiment of the present invention, the security system may further comprise an alarm, wherein the alarm is configured to generate an alarm signal in case the estimated level of probability, $L_P$, of intrusion by the at least one object in the space is above a predetermined threshold, $T_P$. The present embodiment is advantageous in that it may conveniently and efficiently intimidate object(s) (person(s)) which may have the intention of burglary, trespassing, espionage, or the like. The present embodiment is further advantageous in that it may alert people in a building (e.g. residents of a house) that there may be a relatively large probability of one or more persons with malicious intent in the vicinity of the building.

Further objectives of, features of, and advantages with, the present invention will become apparent when studying the following detailed disclosure, the drawings and the appended claims. Those skilled in the art will realize that different features of the present invention can be combined to create embodiments other than those described in the following.

BRIEF DESCRIPTION OF THE DRAWINGS

This and other aspects of the present invention will now be described in more detail, with reference to the appended drawings showing embodiment(s) of the invention.

DETAILED DESCRIPTION

Figure 1A:
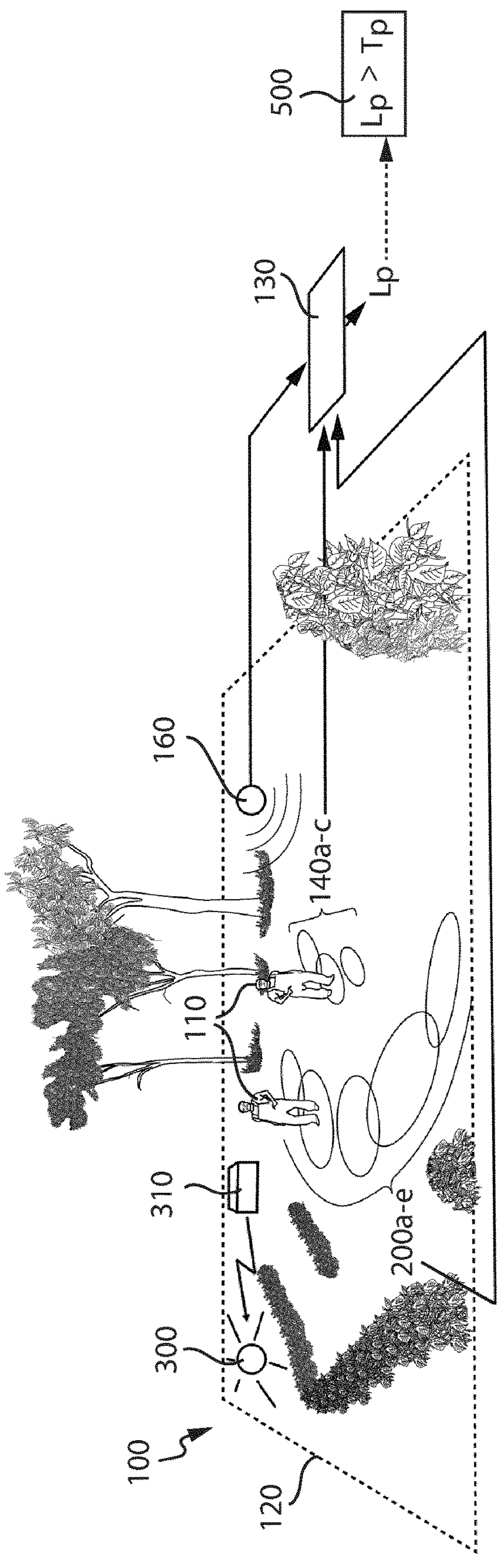
FIG. 1*a* schematically shows a security system according to an exemplifying embodiment of the present invention, FIG. 1*b* schematically shows illumination levels according to an exemplifying embodiment of the present invention, FIG. 2*a* schematically shows a security system according to an exemplifying embodiment of the present invention, FIG. 2*b* schematically shows illumination levels according to an exemplifying embodiment of the present invention, and FIG. 3 schematically shows a method according to an exemplifying embodiment of the present invention.

FIG. 1*a* schematically shows a security system 100 according to an exemplifying embodiment of the present invention. The security system 100 is arranged or configured for estimation of intrusion by at least one object 110 in a space 120. In FIG. 1*a*, the object(s) 110 is exemplified as person(s), but it should be noted that the object(s) 100 may be animal(s), or a device or unit (e.g. a drone). The space 120 may be substantially any space 120 or area, such as a garden, parking space, etc., e.g. in the vicinity of a building (not shown) such as a home, store, etc. Alternatively, the space 120 may be an indoor space, e.g. in a home, office, store, etc.

The security system 100 comprises a processor 130. Here, the processor 130 is schematically indicated, and it should be noted that the processor 130 may be provided substantially anywhere in the security system 100, e.g. in the cloud, in a (remote) computer (central), etc. It will be appreciated that a communication with the processor 130 may be performed by wire or by wireless technology. The processor 130 is configured to obtain (e.g. receive or retrieve) information of the illumination of at least one first subspace 140*a-c* of the space 120. Here, the first subspaces 140*a-c* are exemplified as three (sub) spaces or (sub) areas in the space 120, but it should be noted that the number and/or size of the first subspaces 140*a-c* is arbitrary. Each of the first subspaces 140*a-c* has a respective first level of illumination, $I_1$, within a first interval, $R_1$. The first subspaces 140*a-c* may have individual (i.e. different) first levels of illumination, $I_1$, wherein all first levels of illumination, $I_1$, are within a first interval, $R_1$. Alternatively, the first subspaces 140*a-c* may have the same first level of illumination, $I_1$, wherein this first level of illumination, $I_1$, is within the first interval, $R_1$. The first subspaces 140*a-c* may be illuminated arbitrarily, i.e. by (day)light, artificial light, etc. In alternative examples, the first level of illumination, $I_1$, may be substantially zero (and the interval, $R_1$, may be substantially zero), i.e. indicative of dark. The processor 130 is further configured to obtain information of at least one second subspace 200*a-e* of the space 120. Here, the second subspaces 200*a-e* are exemplified as five (sub) spaces or (sub) areas in the space 120, but it should be noted that the number and/or size of the second subspaces 200*a-e* is arbitrary. For example, the second subspaces 200*a-e* may constitute a (illuminated) path in a garden of a house. The second subspaces 200*a-c* are spatially separated from the first subspaces 140*a-c*.

Each of the second subspaces 200*a-e* has a respective second level of illumination, $I_2$, within a second interval, $R_2$. The second subspaces 200*a-e* may have individual (i.e. different) second levels of illumination, $I_2$, wherein all second levels of illumination, $I_2$, are within a second interval, $R_2$. Alternatively, the second subspaces 200*a-e* may have the same second level of illumination, $I_2$, wherein this second level of illumination, $I_2$, is within the second interval, $R_2$. The relation between the first level(s) of illumination, $I_1$, within the first interval, $R_1$, and the second level(s) of illumination, $I_2$, within the second interval, $R_2$, is that max $(R_1)<\min(R_2)$ if fulfilled. Hence, the second level(s) of illumination, $I_2$, of the second subspaces 200*a-e* is (are) higher than the first level(s) of illumination, $I_1$, of the first subspaces 140*a-c*.

It will be appreciated that the illumination of the first 140*a-c* and/or the second subspaces 200*a-e* may come from sunlight (daylight), one or more light sources (e.g. in a vicinity of the space 120 such as lamp posts), etc. In the example of FIG. 1*a*, the security system 100 comprises one or more light sources 300 (e.g. ZigBee® light sources) arranged to illuminate the first subspaces 140*a-c* of the space 120 by the respective first level of illumination, $I_1$, within the first interval, $R_1$, and the second subspace(s) 200*a-e* of the space 120 by the respective second level of illumination, $I_2$, within the second interval, $R_2$.

Based on the obtained information of the at least one first subspace 140*a-c* and the obtained information of the at least one second subspace 200*a-e*, the processor 130 of the security system 100 is configured to estimate a level of probability, $L_P$, of intrusion by the at least one object 110 in the space 120 based on a detected motion of the at least one object 110, by the at least one sensor 160, in one or more of the first subspaces 140*a-c*. Alternatively, or in combination with the ability to detect motion, the sensor(s) 160 may be configured to detect presence of the object(s) 110. The sensor(s) 160 may be or comprise an image-capturing device, a camera, a radar, a passive infrared, PIR, sensor, a thermopile sensor, and a radio frequency, RF, sensor. Preferably, it is provided a single sensor 160 for motion (and/or presence) detection as exemplified in FIG. 1*a*. According to a non-disclosed example, one or more of the sensor(s) 160 may be arranged in at least one of the light sources 300. Furthermore, one of more of the sensor(s) 160 may be rotatable. Via the sensor(s) 160, the processor 130 is configured to estimate a level of probability, $L_P$, of intrusion by the object(s) 110 in the space 120 based on a detected motion of the object(s) 110 in one or more of the first subspaces 110 which have a (first) level of illumination, $I_1$, which is lower than the (second) level of illumination, $I_2$, of the second subspaces 200*a-e*. In FIG. 1*a*, the operation of the processor 130 is schematically shown as having the detected motion of the object(s) 110 from the sensor(s) 160 as (first) input as well as the obtained information of the illumination of the at least one first subspace 140*a-c* of the space 120 as (second) input, from which inputs the processor 130 may estimate the level of probability, $L_P$, of intrusion by the object(s) 110 in the space 120.

The security system 100 estimates the level of probability, $L_P$, of intrusion by the object(s) 110 in the space 120 based on the observation that (an) object(s) 110 with malicious intent attempting to intrude into the space 120 may be more inclined to avoid areas or spaces which have a (relatively) high illumination, as exemplified as the second subspaces 200*a-e* of the space 120, and instead move in areas or spaces which have a lower level of illumination, as exemplified by the first subspaces 140*a-c* of the space 120. In other words, the security system 100 may estimate that the level of probability, $L_P$, of intrusion by the object(s) 110 in the space 120 is relatively high in case of detected motion of object(s) 110 in first subspaces 140*a-c* of the space 120. Analogously, the security system 100 may estimate that the level of probability, $L_P$, of intrusion by the object(s) 110 in the space 120 is relatively low in case of detected motion of object(s) 110 in the second subspaces 200*a-e* of the space 120. As an example, the security system 100 may estimate a first level of probability, $L_{P1}$, of intrusion by the object(s) 110 in the space 120 in case of detected motion of object(s) 110 in first subspaces 140*a-c* of the space 120, and estimate a second level of probability, $L_{P2}$, of intrusion by the object(s) 110 in the space 120 in case of detected motion of object(s) 110 in the second subspaces 200*a-e* of the space 120, wherein $L_{P1}>L_{P2}$.

FIG. 1*a* further discloses an exemplifying embodiment of the present invention, wherein the processor 130 is further configured to estimate the level of probability, $L_P$, of intrusion by the object(s) 110 in the space based on a detected motion of the object(s) 110, by the sensor(s) 160, in one or more of the second subspaces 200*a-e*, as denoted by the dashed lines. Hence, the operation of the processor 130 is schematically shown as having the illumination of the at least one second subspace 200*a-e* of the space 120 as (the third) input, and/or an input of detected motion of the object(s) 110 in the second subspaces 200*a-e* from the sensor(s) 160, from which inputs the processor 130 may estimate the level of probability, $L_P$, of intrusion by the object(s) 110 in the space 120. It should be noted that the security system 100 estimates the level of probability, $L_P$, of intrusion by the object(s) 110 in the space 120 based on the observation that an object(s) 110 with malicious intent attempting to intrude into the space 120 may be more inclined to avoid areas or spaces which have a (relatively) high illumination. For example, the security system 100 may detect (a) motion(s) of object(s) 110 moving in and/or from the first subspace(s) 140*a-c* to the second subspace(s) 200*a-e*, and thereby estimate that the level of probability, $L_P$, of intrusion by the object(s) 110 may be lower compared to motion of object(s) which (only) take place in the first subspace(s) 140*a-c*.

According to the example in FIG. 1*a* of the security system 100, it further comprises a control unit 310 which is coupled to the at least one light source 310. The control unit 310 is configured to control the at least one light source 300 to illuminate the first subspaces 140*a-c* and/or the second subspaces 200*a-e* of the space 120. The light source(s) 300 may comprise one or more light-emitting diodes, LEDs. For example, the control unit 310 may be configured to control the light source(s) 300 to illuminate the first subspace(s) 140*a-c* by the respective first level of illumination, $I_1$, within the first interval, $R_1$, and/or the second subspaces 200*a-e* by the respective second level of illumination, $I_2$, within the second interval, $R_2$. The control unit 310 may be further configured to control the at least one light source 300 to illuminate the first subspaces 140*a-c* by a first color, $C_1$, and the second subspaces 200*a-e* by a second color, $C_2$, wherein the first color, $C_1$, is different from the second color, $C_2$. For example, the control unit 310 may be configured to illuminate the first subspaces 140*a-c* and/or the second subspaces 200*a-e* such that a homogeneous brightness for animal(s) and an inhomogeneous brightness for persons are provided.

The security system 100 as exemplified in FIG. 1*a* further comprises an alarm 500. The alarm 500 is configured to generate an alarm signal in case the estimated level of probability, $L_P$, of intrusion by the object(s) 110 in the space is above a predetermined threshold, $T_P$.

Figure 1B:
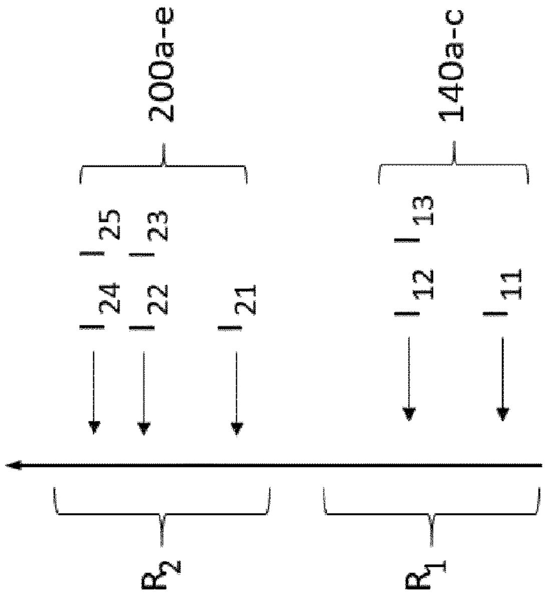

FIG. 1*b* schematically shows the relation between the first level, $I_1$, and the second level, $I_2$, within the respective first interval, $R_1$, and the second interval, $R_2$, of the first subspaces 140*a-c* and the second subspaces 200*a-e* as shown in FIG. 1*a*. For example, the first subspaces 140*a-c* may have respective first levels, $I_{11}$, $I_{12}$, $I_{13}$, which may be the same (i.e. $I_{11}=I_{12}=I_{13}=I_1$) or different (as exemplified in FIG. 1*b*). All first levels, $I_1$, are within the first interval, $R_1$. Analogously, the second subspaces 200*a-e* may have respective second levels, $I_{21}$, $I_{22}$, $I_{23}$, $I_{24}$, $I_{25}$, which may be the same, or different (as exemplified in FIG. 1*b*). All second levels, $I_2$, are within the second interval, $R_2$. FIG. 1*b* shows that max $(R_1)<\min(R_2)$, i.e. that the second level(s) of illumination, $I_2$, of the second subspaces 200*a-e* is (are) higher than the first level(s) of illumination, $I_1$, of the first subspaces 140*a-c*.

Figure 2A:
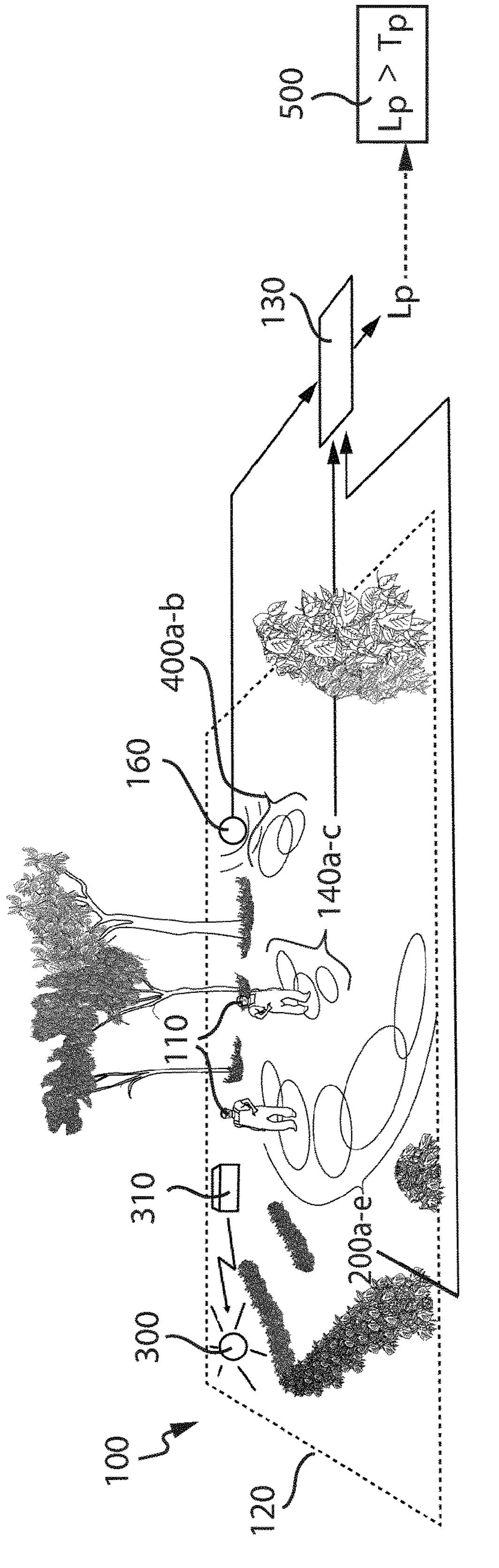
Figure 2B:
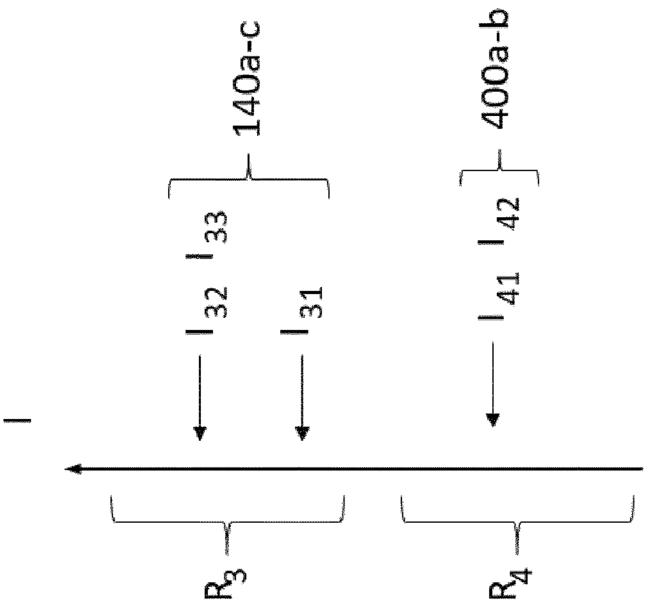

FIG. 2*a* schematically shows an exemplifying embodiment of the security system 100. It will be appreciated that the security system 100 has many features in common with the security system 100 as exemplified in FIG. 1*a*, and it is also referred to FIG. 1*a* and the associated text for an increased understanding. In FIG. 2*a*, in case the estimated level of probability, $L_P$, of intrusion by the object(s) 110 in the space 120 is above a predetermined threshold, $T_P$, the control unit 310 is further configured to control the light source(s) 300 to illuminate the first subspaces 140*a-c* of the space 120 by a third level of illumination, $I_3$, within a third interval, $R_3$, wherein max $(R_1)<\min(R_3)$, as shown in FIG. 2*b*. For example, and compared to FIGS. 1*a-b* and the associated text(s), the control unit 310 may be configured to control the light source(s) 300 such that the first subspaces 140*a-c* are illuminated to the same level as the second subspaces 200*a-e*, i.e. $I_2=I_3$ and/or $R_2=R_3$. The control unit 310 is further configured to control the light source(s) 300 to illuminate at least one third subspace 400*a-b* of the space 120, wherein the third subspaces 400*a-b* is adjacent to the first subspaces 140*a-c*. Here, the third subspaces 400*a-b* are exemplified as two (sub) spaces or (sub) areas in the space 120, but it should be noted that the number and/or size of the third subspaces 400*a-b* is arbitrary. The control unit 310 may be configured to illuminate the third subspaces 400*a-b* to a respective fourth level of illumination, $I_4$, within a fourth interval, $R_4$, wherein max $(R_4)<\min(R_3)$. In alternative examples, the fourth level of illumination, $I_4$, may be substantially zero (and the interval, $R_4$, may be substantially zero), i.e. indicative of dark. The processor 130 is configured to estimate the level of probability, $L_P$, of intrusion by the at least one object in the space 120 based on a detected motion of the object(s) 110, by the sensor(s) 160, in one or more of the third subspace(s) 400*a-b*. It will be appreciated that in case one or more objects (persons) 110 move from the first subspace(s) 140*a-c* and/or second subspace(s) 200*a-e* into the third subspace(s) 400*a-b* in order to avoid the higher level of illumination, this may indicate a malicious intent of the object(s)/person(s) 110 and thereby increase the level of probability, $L_P$, of intrusion as estimated by the security system 100. In contrast, in case the object(s)/person(s) 110 remain in the first and/or second subspace(s) 140*a-c*, 200*a-e*, this may contradict or impugn a malicious intent of the object(s)/person(s) 110 and thereby decrease the level of probability, $L_P$, of intrusion as estimated by the security system 100.

Figure 3:
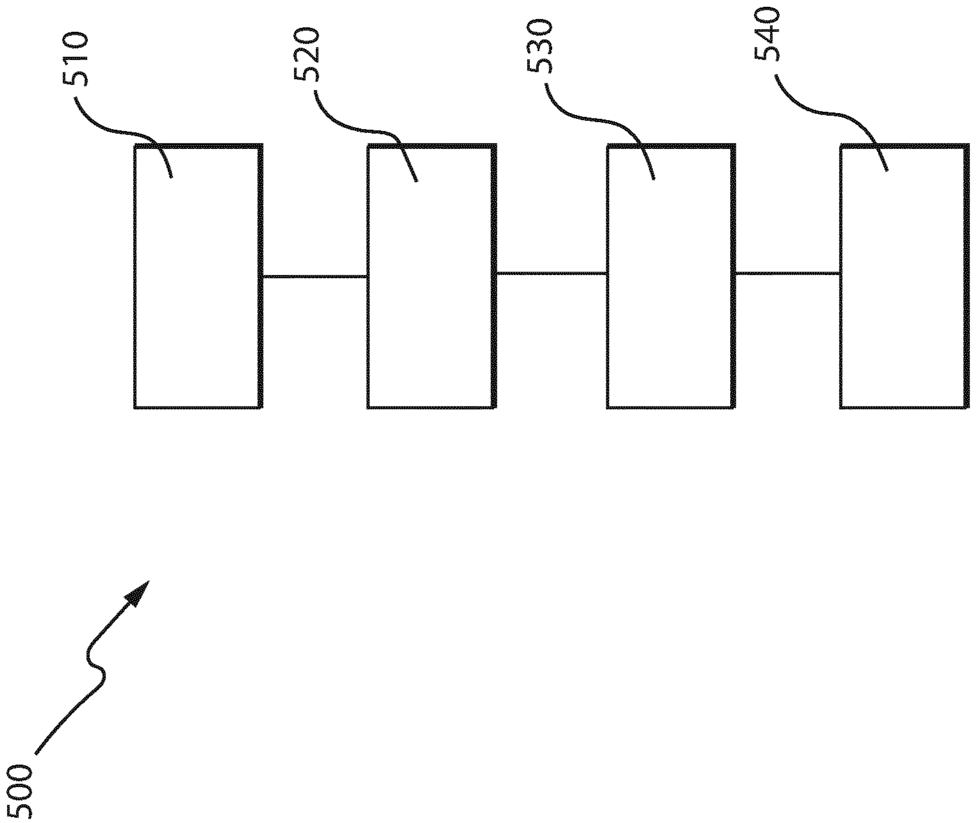

FIG. 3 schematically discloses the method 500 according to the second aspect of the present invention for estimation of intrusion by at least one object in a space. The method 500 comprises obtaining 510 information of at least one first subspace of the space, wherein the at least one first subspace has a first level of illumination, $I_1$, within a first interval, $R_1$. The method 500 further comprises obtaining 520 information of at least one second subspace of the space, the at least one second subspace being spatially separated from the at least one first subspace and having a second level of illumination, $I_2$, within a second interval, $R_2$, wherein max $(R_1)$<min $(R_2)$. The method 500 further comprises detecting 530 motion of the at least one object, and estimating 540 a level of probability, $L_P$, of intrusion by the at least one object in the space based on a detected motion of the at least one object in at least one of the at least one first subspace.

The person skilled in the art realizes that the present invention by no means is limited to the preferred embodiments described above. On the contrary, many modifications and variations are possible within the scope of the appended claims. For example, the size, number, positioning, etc., of the first subspaces 140*a-c*, the second subspaces 200*a-e*, etc., may be different than that shown.

The invention claimed is:

1. A security system for estimation of intrusion by at least one object in a space, wherein the security system comprises:

a processor configured to:

obtain information of an illumination of at least one first subspace of the space, each of the at least one first subspace having a respective first level of illumination, $I_1$, within a first light intensity interval, $R_1$, and obtain information of an illumination of at least one second subspace of the space, the at least one second subspace being spatially separated from the at least one first subspace, and each of the at least one second subspace having a respective second level of illumination, $I_2$, within a second light intensity interval, $R_2$, wherein max $(R_1)$<min $(R_2)$;

at least one sensor communicatively coupled to the processor, the at least one sensor being configured to detect motion of the at least one object in the space;

wherein the processor, based on the obtained information of the illumination of the at least one first subspace and the obtained information of the illumination of the at least one second subspace, is configured to:

estimate a first level of probability, $L_{P1}$, of intrusion by the at least one object in the space based on a detected motion of the at least one object, by the at least one sensor, in at least one of the at least one first substrate, and estimate a second level of probability, $L_{P2}$, of intrusion by the at least one object in the space based on a detected motion of the at least one object, by the at least one sensor, in at least one of the at least one second subspace, wherein $L_{P1}$>$L_{P2}$.

2. The security system according to claim 1, wherein the processor further being configured (i) to wirelessly obtain the information of the illumination of the at least one first subspace of the space and (ii) to wirelessly obtain the information of the illumination of the at least one second subspace of the space.

3. The security system according to claim 1, further comprising at least one light source arranged to illuminate the at least one first subspace of the space by the respective first level of illumination, $I_1$, within the first light intensity interval, $R_1$.

4. The security system according to claim 1, wherein the at least one light source arranged to illuminate the at least one second subspace of the space by the respective second level of illumination, $I_2$, within the second light intensity interval, $R_2$.

5. The security system according to claim 3, further comprising a control unit coupled to the at least one light source, wherein the control unit configured to control the at least one light source to illuminate the at least one first subspace of the space.

6. The security system according to claim 5, wherein the control unit further configured to control the at least one light source to illuminate the at least one first subspace of the space by the respective first level of illumination, $I_1$, within the first light intensity interval, $R_1$.

7. The security system according to claim 4, wherein the control unit further configured to control the at least one light source to illuminate the at least one second subspace of the space by the respective second level of illumination, $I_2$, within the second light intensity interval, $R_2$.

8. The security system according to claim 7, wherein the control unit further configured to control the at least one light source to illuminate:

the at least one first subspace of the space by a first color, $C_1$, and the at least one second subspace of the space by a second color, $C_2$, wherein the first color, $C_1$, is different from the second color, $C_2$.

9. The security system according to claim 5, wherein in case the estimated first level of probability, $L_{P1}$, of intrusion by the at least one object in the space is above a predetermined threshold, $T_P$, the control unit further configured to control the at least one light source to:

illuminate the at least one first subspace of the space by a respective third level of illumination, $I_3$, within a third light intensity interval, $R_3$, wherein max $(R_1)$<min $(R_3)$, and illuminate at least one third subspace of the space, wherein the at least one third subspace is adjacent to the at least first subspace, by a respective fourth level of illumination, $I_4$, within a fourth light intensity interval, $R_4$, wherein max $(R_4)$<min $(R_3)$, wherein the processor is configured to estimate the first level of probability, $L_{P1}$, of intrusion by the at least one object in the space based on a detected motion of the at least one object, by the at least one sensor, in at least one of the at least one third subspace.

10. The security system according to claim 4, wherein in case the estimated first level of probability, $L_{P1}$, of intrusion by the at least one object in the space is above a predetermined threshold, $T_P$, the control unit is further configured to control the at least one light source to illuminate the at least one first subspace of the space and the at least one second subspace of the space by the respective second level of illumination, $I_2$, within the second light intensity interval, $R_2$.

11. The security system according to claim 1, wherein the processor configured to determine when the at least one object is a person.

12. The security system according to claim 1, wherein the at least one sensor comprises at least one of an image-capturing device, a camera, a radar, a passive infrared, PIR, sensor, a thermopile sensor, a time-of-flight proximity sensor, a pressure sensor, a microphone array, and a radio frequency, RF, sensor.

13. The security system according to claim 5, wherein at least one of the at least one sensor arranged in at least one of the at least one light source.

14. The security system according to claim 1, further comprising an alarm, wherein the alarm configured to generate an alarm signal in case the estimated level of probability, $L_P$, of intrusion by the at least one object in the space is above a predetermined threshold, $T_P$.

15. A method for estimation of intrusion by at least one object in a space, wherein the method comprises obtaining information of an illumination of at least one first subspace of the space, wherein each of the at least one first subspace has a respective first level of illumination, $I_1$, within a first light intensity interval, $R_1$, obtaining information of an illumination of at least one second subspace of the space, the at least one second subspace being spatially separated from the at least one first subspace, and wherein each of the at least one second subspace has a respective second level of illumination, $I_2$, within a second light intensity interval, $R_2$, wherein max $(R_1)<$min $(R_2)$, detecting motion of the at least one object in the space, estimating, based on the obtained information of the illumination of the at least one first subspace and the obtained information of the illumination of the at least one second subspace, a first level of probability, $L_{P1}$, of intrusion by the at least one object in the space based on a detected motion of the at least one object in at least one of the at least one first subspace;

estimating a second level of probability, $L_{P2}$, of intrusion by the at least one object in the space based on a detected motion of the at least one object, by the at least one sensor, in at least one of the at least one second subspace;

wherein $L_{P1}>L_{P2}$.

* * * * *